United States Patent Office 3,029,451
Patented Apr. 17, 1962

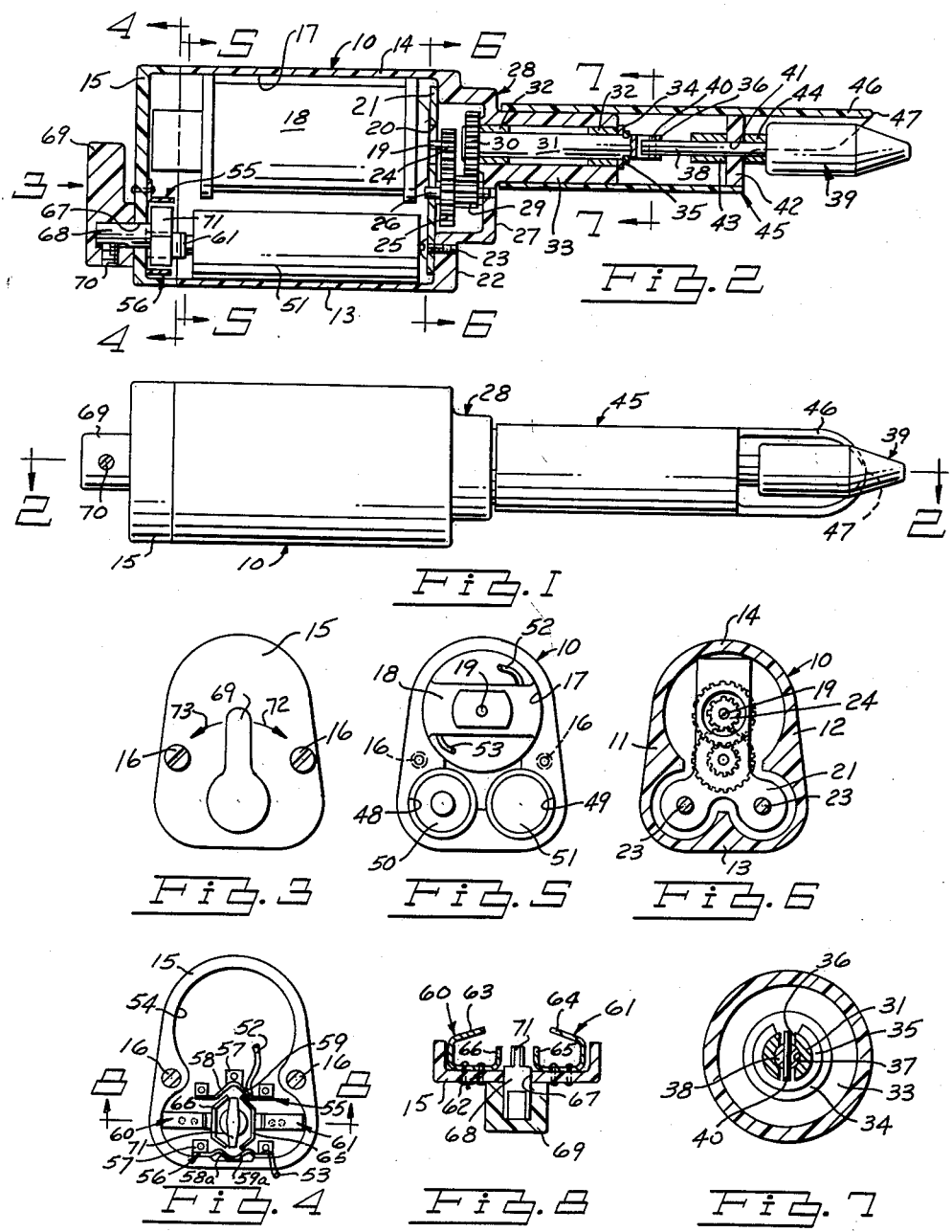

3,029,451
POWER DRIVEN SELF-CONTAINED TOOTHBRUSH AND GUM MASSAGE APPARATUS
Samuel W. Barr, 1311 Balmoral Drive, Detroit, Mich., assignor of forty-one percent to Herbert M. Robinson, Detroit, Mich.
Filed Dec. 22, 1958, Ser. No. 782,173
3 Claims. (Cl. 15—23)

This invention relates generally to improvements in the dental art, and, more particularly, to a novel power driven self-contained toothbrush and gum massage apparatus.

It is an important object of this invention to provide an improved power driven dental apparatus which includes a quickly and easily detachable dental tool, whereby, the apparatus may be used as a toothbrush or a gum massage apparatus by merely attaching an appropriate dental tool.

It is another object of this invention to provide an improved power driven dental apparatus which is powered by a self-contained battery power means and which is controlled by a novel switch means.

It is a further object of this invention to provide an improved power driven dental apparatus which is simple and compact in construction, economical of manufacture, attractive in appearance, and efficient in operation.

It is a still further object of this invention to provide an improved power driven toothbrush and gum massage apparatus which may be easily and safely operated by children as well as adults.

Other objects, features and advantages of this invention will be apparent from the following detailed description and appended claims, reference being had to the accompanying drawings forming a part of the specification wherein like reference numerals designate corresponding parts of the several views.

In the drawing:

FIG. 1 is a bottom view of a preferred embodiment of the invention;

FIG. 2 is a longitudinal sectional view of the structure illustrated in FIG. 1, taken along the line 2—2 thereof, and looking in the direction of the arrows;

FIG. 3 is an end view of the structure illustrated in FIG. 2, taken in the direction of the arrow marked "3";

FIG. 4 is an elevational sectional view of the structure illustrated in FIG. 2, taken along the line 4—4 thereof, and looking in the direction of the arrows;

FIG. 5 is an elevational sectional view of the structure illustrated in FIG. 2, taken along the line 5—5 thereof, and looking in the direction of the arrows;

FIG. 6 is an elevational sectional view of the structure illustrated in FIG. 2, taken along the line 6—6 thereof, and looking in the direction of the arrows;

FIG. 7 is an enlarged elevational sectional view of the structure illustrated in FIG. 2, taken along the line 7—7 thereof, and looking in the direction of the arrows; and FIG. 8 is an enlarged elevational sectional view of the structure illustrated in FIG. 4, taken along the line 8—8 thereof, and looking in the direction of the arrows.

Referring now to the drawing wherein is shown a preferred embodiment of the invention, and especially to FIGS. 1 and 2, the numeral 10 generally indicates the body which includes the integral side walls 11 and 12, bottom wall 13 and top wall 14. The body 10 may be made from any suitable material, as for example, from a plastic material as a hi-impact styrene plastic which may be colored as desired. As shown in FIG. 6 the top wall 14 is rounded off, and the side walls 11 and 12 taper inwardly and upwardly from the flat bottom wall 13. It will be seen, that the body disposition of the body walls provides the body with an exterior shape which is well adapted for a comfortable hand grip by an operator when using the device.

The rear end of the body 10 is enclosed by the end cover 15 which may be secured to the body 10 by any suitable means as by the two screws 16. As shown in FIGS. 2 and 5, the body walls are formed on the inner sides thereof to provide a longitudinally extended socket for an electric drive motor, as for example, a 3 to 4½ volt reversible direct current motor 18 or the like. The motor 18 is provided with an output shaft or drive shaft 19 on the forward end thereof which extends through the aperture 20 in the supporting plate 21. The plate 21 is secured to the front body end wall 22 by any suitable means as by screws 23.

The drive means 18 is adapted to be connected to a suitable reduction gear means as more fully described hereinafter. As shown in FIGS. 2 and 6, the drive shaft 19 is fixedly connected to the drive gear 24 which meshes with and drives the jack or driven gear 25. The gear 25 is fixedly mounted on the stub shaft 26 one end of which is suitably journalled in an aperture in the supporting plate 21 and the other end of which is suitably journalled in the front end wall 27 of the hub 28. The forwardly extended hub 28 is integrally formed with the front end wall 22 of the body 10. The stub shaft 26 also carries the fixedly mounted spur drive gear 29 which meshes with and drives the driven gear 30 which is carried on the rear end of the drive shaft 31.

As shown in FIG. 2, the drive shaft 31 is suitably supported by means of suitable bearings as 32 in the elongated tubular forwardly extended nose portion 33. The nose portion 33 is an integral forwardly projected extension of the overall body structure from the front wall 27 of the hub 28.

The drive shaft 31 is fixed in place longitudinally relative to the nose portion 33 by means of the washer 34 and the C-shaped retainer ring 35. As shown in FIGS. 2 and 7, the forward end of the drive shaft 31 is provided with a transverse slot therethrough as 36 as well as with an axial recess 37. The recess 37 is adapted to slidably receive the rear end of the shaft 38 which carries a dental tool generally indicated by the numeral 39 on the other end thereof. The rear end of the shaft 38 is also provided with a cross-pin 40 which is adapted to slidably mesh with the transverse slot 36 in the drive shaft 31. It will be seen that the aforementioned intermeshing structure on the front end of the drive shaft 31 and on the rear end of the dental tool 38 functions as a suitable coupling means adapted for easy and quick operation whereby a dental tool as 39 may be easily and quickly attached to or detached from the drive shaft 31.

As shown in FIGS. 1 and 2, the dental tool carrying or supporting shaft 38 is rotatably mounted in the aperture 41 formed centrally through the annular nylon bearing 42. A nylon bearing 42 is fixedly secured in place lengthwise relative to the shaft 38 by means of the compact spacer sleeves 43 and 44 which are made from any suitable material as stainless steel or the like and which are fixedly mounted on the shaft 38. The nylon bearing 42 is press fitted into the outer end of the elongated tubular carrier member generally indicated by the numeral 45. The tubular carrier member 45 is adapted to have the rear end thereof slidably and releasably mounted on the nose portion 33 of the body 10. The lower portion of the forward end of the carrier member 45 is cut away back of the front end of the bushing 45 as shown in FIGS. 1 and 2 so as to provide a half round protective guard portion indicated by the numeral 46. The front edge 47 of the guard portion 46 is provided with a rounded surface. As best seen in FIG. 2, the dental tool or brush 39 extends outwardly and downwardly from the guard portion 46 of the carrier member 45 for working engagement with the teeth or gums of the user. It will be understood that the dental tool 39 may be made from any suitable brush material or the like and formed to any desired shape depending upon the use to which it is to be applied. For example: The dental tool 39 for cleaning teeth would be formed preferably from a bristle nylon material and the dental tool 39 for gum massage work would be formed from a similar material but to a different shape.

As shown in FIGS. 2 and 5, the main portion of the body 10 is provided with the two battery sockets 48 and 49 which are formed by approximately contouring the insides of the body walls to provide a pair of elongated annular recesses. Slidably mounted in the sockets 48 and 49 are two suitable batteries 50 and 51 such as two 1½ volt penlite batteries.

The batteries 50 and 51 are electrically connected at their forward ends by means of the screws 23 and the supporting plate 21. The heads of the screws 23 contact the forward ends of the batteries and the circuit therebetween is completed through the plate 21 which is made from a suitable metallic or other conductive material. As shown in FIG. 5, the lead wires from the motor 18 are indicated by the numerals 52 and 53 and they are electrically connected to a novel suitable switch means which is operatively mounted in the recess 54 formed in the inner side of the end cover 15.

As shown in FIG. 4, the motor lead wires 52 and 53 are connected to the fixed switch contact plates 55 and 56, respectively. The contact plates 55 and 56 are vertically spaced apart on the inside surface of the end cover 15 and are secured thereto by any suitable means as by the rivets 57. As shown in FIG. 4, the contact plates 55 and 56 are each formed with a central portion which is bent outwardly to form a triangular recess or pocket having the two sides 58 and 59. The sides of the recess in the plate 56 being marked as 58a and 59a. A pair of spring contact members generally indicated by the numerals 60 and 61 are fixedly mounted on the inside of the end cover 15 by any suitable means as by the rivets 62, and they are disposed on a transverse line midway between the fixed contact plates 55 and 56.

The spring contact members 60 and 61 are each provided with an L-shaped spring arm on one end thereof as 63 and 64 which is adapted to make electrical contact with one of the batteries, as 51 and 50, respectively, when the end cover 15 is fixed on the body 10. The other end of each of the contact members 60 and 61 is provided with a movable spring contact arm as 65 and 66, respectively. The spring contact arms 65 and 66 are disposed vertically and have the ends thereof bent inwardly and normally disposed adjacent to but spaced from the walls 58 and 59, and 58a and 59a.

The end cover 15 is provided with a hole therethrough as 67 which is disposed centrally between the fixed contact plates 55 and 56 and the spring contact plates 60 and 61. Rotatably mounted through the hole 67 is the shaft 68 which is formed from a suitable non-conductive material such as a suitable plastic, or the like. Fixedly mounted on the outer end of the shaft 68 is an operating lever 69 which is fixedly secured in place by any suitable means as by a suitable lock-screw 70. The inner end of the shaft 68 is formed with an integral elongated arm 71 which is normally disposed in the vertical position. The switch operating arm 71 is held in the normal inoperative vertical position as shown in FIG. 4 because in this position it is engaged by the inwardly bent ends of the movable spring contact arms 65 and 66.

In use, the device of the present invention would first be provided with the appropriate dental tool 39 and in order to cause rotation of the dental tool, the operating lever 69 is moved in either a clock-wise or counter-clock-wise direction as shown by the arrows 72 and 73, respectively, in FIG. 3. When the lever 69 is moved in the direction of the clock-wise arrow 72, the switch operating arm 71 will force the upper bent edge of the spring contact arm 66 into contact with the fixed contact plate wall 58. The lower end of the switch arm 71, as viewed in FIG. 4, will move the lower inwardly bent end of the movable spring contact arm 65 into electrical contact with the wall 59a of the fixed contact plate 56. It will be seen that such action puts the batteries in circuit with the motor 18 whereby it will be energized to rotate in one direction. In order to stop the rotation of the dental tool, the operator merely releases the operating lever 69 and the spring contact members 65 and 66 will function to force the switch lever 69 back to the central inoperative position, as shown in FIG. 3. Rotation of the dental tool in the opposite direction may be obtained by moving the switch member counter-clock-wise as shown in FIG. 3 in the direction of the arrow 73 and such action will cause the upper inwardly bent end of the movable contact 65 to engage the wall 59 of the upper fixed contact plate 55. Such action will also cause the lower inwardly bent end of the movable end of the contact plate 66 into electrical contact with the wall 58a on the fixed contact plate 56.

Experience has shown that the device of the present invention is efficient and quick operating in operation. It will be obvious that the various plastic materials used in making the different parts of the device may be colored as desired.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. An apparatus of the class described, comprising: a body member; an electric motor mounted in said body and having an output shaft on the forward end thereof; said body having a reduced extension portion on the front end of the body; a drive shaft rotatably supported by the reduced extension portion of said body; a gear reduction means operatively connecting the output shaft of said motor to said drive shaft; a carrier member releasably mounted on the front end of said body; a dental tool rotatably mounted on said carrier member; coupling means for detachably coupling said drive shaft to said dental tool; battery means mounted in said body; an end cover enclosing the rear end of said body member; a switch means mounted in said cover for connecting said battery means to said motor for energizing the same; said switch means including a pair of vertically spaced apart fixed contact plates with each plate being connected to a separate motor lead wire, a pair of horizontally spaced apart spring contact members electrically connected to said battery means and being disposed between said first named pair of contact plates, and, means for manually biasing said spring contact members into engagement with said fixed contact plates.

2. An apparatus of the class described, comprising: a body member having an open rear end; an electric motor mounted in the upper end of said body and having an output shaft extended from the front end thereof; the front end of said body member being enclosed by an integral end wall from which is forwardly extended a reduced tubular extension member; a drive shaft rotatably supported by the reduced extension member of said body; a gear reduction means operatively connecting the output shaft of said motor to said drive shaft; a carrier member releasably mounted on the reduced tubular extension member; said carrier member being tubular and having a bearing member mounted in the front end thereof; a dental tool rotatably mounted on said carrier member and having a shaft operatively supported by said bearing member; a guard member on the carrier member extended outwardly therefrom over said dental tool; coupling means on said drive shaft and said dental tool shaft for detachably coupling said drive shaft to said dental tool shaft; battery means mounted in said body below said electric member; an end cover enclosing the open rear end of said body member; a switch means mounted in said cover for connecting said battery means to said motor for energizing the same; said switch means including a pair of vertically spaced apart fixed contact plates with each plate being connected to a separate motor lead wire; a pair of horizontally spaced apart spring contact members electrically connected to said battery means and being disposed between said first named pair of contact plates, and, means for manually biasing said spring contact members into engagement with said fixed contact plates.

3. An apparatus of the class described, comprising: a body member having an open rear end; an electric motor mounted in the upper end of said body and having an output shaft extended from the front end thereof; the front end of said body member being enclosed by an integral end wall from which is forwardly extended a reduced tubular extension member; a drive shaft rotatably supported by the reduced extension member of said body; a gear reduction means operatively connecting the output shaft of said motor to said drive shaft; a carrier member releasably mounted on the reduced tubular extension member; said carrier member being tubular and having a bearing member mounted in the front end thereof; a dental tool rotatably mounted on said carrier member and having a shaft operatively supported by said bearing member; a guard member on the carrier member extended outwardly therefrom over said dental tool; coupling means on said drive shaft and said dental tool shaft for detachably coupling said drive shaft to said dental tool shaft; battery means mounted in said body below said electric member; an end cover enclosing the open rear end of said body member; a switch means mounted in said body member for connecting said battery means to said motor for energizing the same; said switch means including a pair of vertically spaced apart fixed contact plates with each plate being connected to a separate motor lead wire; a pair of horizontally spaced apart spring contact members electrically connected to said battery means and being disposed between said first named pair of contact plates, and, means for manually biasing said spring contact members into engagement with said fixed contact plates.

References Cited in the file of this patent

UNITED STATES PATENTS

| | | |
|---|---|---|
| 459,222 | Lehmann | Sept. 8, 1891 |
| 873,123 | Gardy | Dec. 10, 1907 |
| 1,394,636 | Murray | Oct. 25, 1921 |
| 1,396,630 | Higbee | Nov. 8, 1921 |
| 1,598,411 | Allen | Aug. 31, 1926 |
| 2,124,145 | Merkel | July 19, 1938 |
| 2,185,229 | Scott | Apr. 2, 1940 |
| 2,279,982 | Glynn | Apr. 14, 1942 |
| 2,310,626 | Gold | Feb. 9, 1943 |
| 2,462,495 | Harrison | Feb. 22, 1949 |
| 2,601,567 | Steinberg | June 24, 1952 |
| 2,840,837 | Gustems | July 1, 1958 |

FOREIGN PATENTS

| | | |
|---|---|---|
| 748,823 | France | Apr. 25, 1933 |